K. H. WIMMER & E. B. HIGGINS.
PROCESS FOR THE REDUCTION OR HYDROGENATION OF ORGANIC COMPOUNDS, ESPECIALLY
THE FATTY ACIDS AND THEIR COMPOUNDS.
APPLICATION FILED MAR. 12, 1912.
1,081,182.
Patented Dec. 9, 1913.
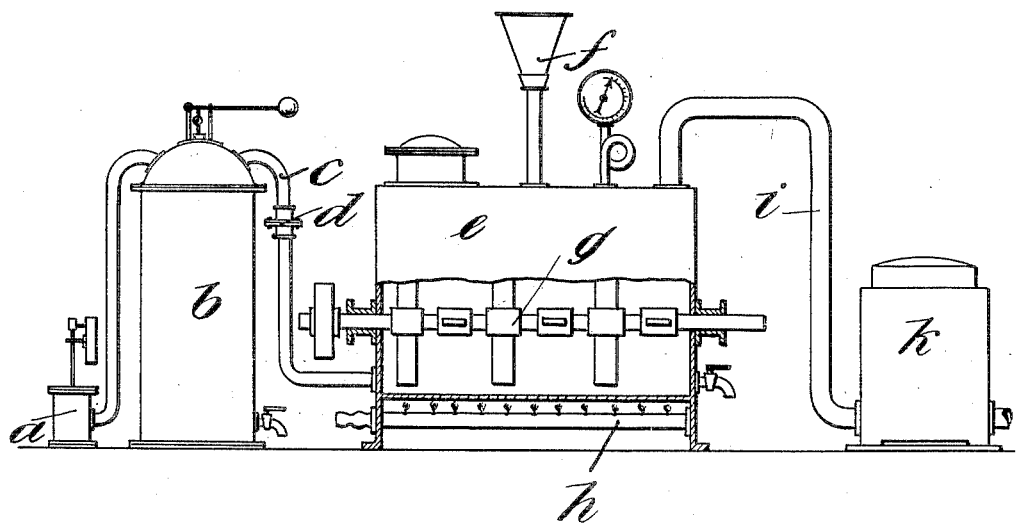
Witnesses:
Inventors
Karl H. Wimmer
Eric B. Higgins

UNITED STATES PATENT OFFICE.

KARL HEINRICH WIMMER, OF BREMEN, GERMANY, AND ERIC BERKELEY HIGGINS, OF WALLASEY, ENGLAND.

PROCESS FOR THE REDUCTION OR HYDROGENATION OF ORGANIC COMPOUNDS, ESPECIALLY THE FATTY ACIDS AND THEIR COMPOUNDS.

1,081,182.      Specification of Letters Patent.      Patented Dec. 9, 1913.

Application filed March 12, 1912. Serial No. 683,294.

*To all whom it may concern:*

Be it known that we, KARL HEINRICH WIMMER and ERIC BERKELEY HIGGINS, subjects, respectively, of the German Emperor and the King of the British Dominions, residing, respectively, at Bremen, Germany, and Wallasey, Cheshire, England, have invented a certain new and useful Process for the Reduction or Hydrogenation of Organic Compounds, Especially the Fatty Acids and Their Compounds, of which the following is a specification.

It is known that when unsaturated organic compounds are treated with hydrogen in the presence of catalysts consisting of finely divided freshly reduced metals, an addition of hydrogen to such unsaturated organic compounds can be effected. These catalysts require special preparation.

The present invention has for its object to avoid the necessity of the special preparation of the catalysts and considerably to facilitate the treatment.

According to the invention the reduction of organic compounds such, for example, as fatty acids and their glycerids is effected by hydrogen or gas mixtures containing hydrogen and by catalysis in the employment of organic metal salts such as the formates, acetates or lactates of copper, iron, nickel or cobalt. These organic metallic salts can be easily and cheaply produced. They can also be purchased in a pure form, and they require no special preparation before their use as catalytic agents; while moreover the impurities contained in the reducing gas employed in the treatment do not render these compounds ineffective. Furthermore, when the substance to be reduced is a liquid it can be easily emulsified with or be brought in a state of extremely fine subdivision into admixture with the catalytic compound.

In the processes hitherto known, in which finely divided metals are employed in the treatment of unsaturated compounds, it has been necessary either to employ continuous and intense mechanical agitation to obtain admixture of the catalysts and the liquid, or to distribute the metal over the outer surface of contact carriers such as pumice stone, kieselguhr, etc. In the present process the compound to be reduced is mixed with the organic metallic salt or a solution thereof heated to a suitable temperature, and either a stream of the reducing gas is passed through the mixture, or the latter is subjected to an atmosphere of the gas in a closed vessel, while contact between the gas and the mixture or emulsion may be assisted by agitation. Under these conditions the saturation takes place comparatively quickly and the spent or partly spent catalytic agent can be removed by simple filtration after the operation.

In carrying the invention into effect according to one example, 100 grams of cotton seed oil are mixed with 1 to 5 grams of nickel formate (in concentrated aqueous solution or in the form of powder). The mixture is warmed and a stream of hydrogen gas passed into the apparatus. During this time the temperature of the mass is raised to from 170 to 200 degrees C. The duration of the treatment depends upon the quantity of the catalytic agent employed. The reduction may be carried out until the unsaturated compounds are quantitatively transformed into saturated ones. The mass is then filtered.

For the present process the metal salts, both normal and acid, of the mono- and poly-basic carboxylic acids and hydrocarboxylic acids of the fatty groups are most suitable, for instance the formates, acetates, propionates, butyrates, lactates, glycollates, oxalates, malonates, succinates, tartrates and citrates of nickel, cobalt, iron and copper.

The process may be modified in various ways. Thus, for example, the oil may be emulsified with the catalytic agent and simultaneously heated and have hydrogen or gas mixtures containing hydrogen passed through it in a suitable emulsifying apparatus; or the oil mixed with the catalytic agent may be brought into contact in a fine state of division with the hydrogen, as in a manner that has already been proposed. The reaction may also be accelerated by using the hydrogen under pressure or by impregnating the oil with hydrogen and then bringing it into intimate contact with the catalytic agent.

The annexed drawing is a side view in section of an apparatus suitable for carrying out our process.

The gas is drawn by a pump $a$ from a generator (not shown) and is forced by the pump into the pressure equalizer $b$. Thence the gas passes through a pipe $c$, provided with a funnel $f$ for introducing the mixture of catalyzer and oil. The mixing apparatus contains an agitator chiefly consisting of a longitudinal shaft provided with a series of revolving beaters $g$. In the base of the mixing apparatus is mounted a heating appliance $h$ of any suitable type. If water gas is used as the reducing agent, the portion of the gas, which has not been absorbed in the mixing apparatus, passes through a pipe $i$ to a gas-holder or collector $k$, and is then used for heating or motive power purposes.

What is claimed is:

1. The process for the reduction of organic compounds by a reducing gas and by catalysis, which consists in treating such a compound with an organic metal salt and a reducing gas, substantially as described.

2. The process for the reduction of organic compounds by hydrogen and by catalysis, which consists in treating such a compound with an organic metal salt and hydrogen, substantially as described.

3. The process for the reduction of organic compounds by gas mixtures containing hydrogen and by catalysis, which consists in treating such a compound with an organic metal salt and gas mixtures containing hydrogen, substantially as described.

4. The process for the reduction of fatty acids by a reducing gas and by catalysis, which consists in treating such an acid with an organic metal salt and a reducing gas, substantially as described.

5. The process for the reduction of glycerids of fatty acids by a reducing gas and by catalysis, which consists in treating such a compound with an organic metal salt and a reducing gas, substantially as described.

In testimony whereof we have hereunto set our hands in presence of the subscribing witnesses.

KARL HEINRICH WIMMER.
ERIC BERKELEY HIGGINS.

Witnesses as to Karl Heinrich Wimmer:
  WILHELM STRUP,
  AUGUST BEIFS.

Witnesses as to Eric Berkeley Higgins:
  WM. PIERCE,
  H. WILLIAMS,
  JOHN MCCORMICK.